United States Patent
Rein et al.

(10) Patent No.: US 11,232,773 B2
(45) Date of Patent: Jan. 25, 2022

(54) METHOD AND SYSTEM FOR AI CONTROLLED LOOP BASED SONG CONSTRUCTION

(71) Applicant: BELLEVUE INVESTMENTS GMBH & CO. KGAA, Berlin (DE)

(72) Inventors: Dieter Rein, Berlin (DE); Jurgen Jaron, Berlin (DE)

(73) Assignee: BELLEVUE INVESTMENTS GMBH & CO. KGAA

( * ) Notice: Subject to any disclaimer, the term of this patent is extended or adjusted under 35 U.S.C. 154(b) by 139 days.

(21) Appl. No.: 16/869,334

(22) Filed: May 7, 2020

(65) Prior Publication Data

US 2020/0357371 A1 Nov. 12, 2020

Related U.S. Application Data (60) Provisional application No. 62/844,171, filed on May 7, 2019.

(51) Int. Cl.
| | |
|---|---|
| *G10H 1/00* | (2006.01) |
| *G10H 7/08* | (2006.01) |
| *G06N 20/00* | (2019.01) |
| *G06F 16/635* | (2019.01) |
| *G06K 9/62* | (2006.01) |

(52) U.S. Cl.
CPC ......... *G10H 1/0041* (2013.01); *G06F 16/635* (2019.01); *G06K 9/6256* (2013.01); *G06N 20/00* (2019.01); *G10H 1/0025* (2013.01); *G10H 7/08* (2013.01); *G10H 2210/036* (2013.01); *G10H 2210/111* (2013.01); *G10H 2210/151* (2013.01)

(58) Field of Classification Search
CPC ...... G10H 1/00; G10H 1/0025; G10H 1/0041; G10H 2240/131; G10H 2210/105; G10H 2210/111; G10H 2240/325; G10H 2240/145; G10H 2240/141; G10H 2210/101; G10H 2210/005
See application file for complete search history.

(56) References Cited

U.S. PATENT DOCUMENTS

| | | | |
|---|---|---|---|
| 6,545,209 B1 * | 4/2003 | Flannery | G10H 1/0008 84/609 |
| 9,502,017 B1 * | 11/2016 | Becherer | G10H 1/0025 |
| 9,799,312 B1 * | 10/2017 | Cabral | G06N 5/04 |
| 2013/0269504 A1 * | 10/2013 | Seese, Jr | G10H 1/0025 84/609 |
| 2019/0164528 A1 * | 5/2019 | Sheppard | G10H 1/38 |
| 2019/0259360 A1 * | 8/2019 | Yoelin | G10H 1/366 |
| 2020/0357371 A1 * | 11/2020 | Rein | G06N 20/00 |
| 2021/0020149 A1 * | 1/2021 | Li | G11B 27/031 |

(Continued)

*Primary Examiner* — Marlon T Fletcher
(74) *Attorney, Agent, or Firm* — Fellers, Snider, Blankenship, Bailey & Tippens, P.C.; Terry L. Watt (57) ABSTRACT

According to an embodiment, there is provided a system and method for automatic AI controlled loop based song construction. It provides and benefits from a machine learning AI in a audio loop selection engine for the generation of a song structure and for the selection of fitting audio loops from a database of audio loops. In one embodiment, the instant method provides a music generation process that utilizes an AI system that has been trained and validated on a music item database to complete the creation of a music item given an incomplete song that was started but not finished by a user.

7 Claims, 4 Drawing Sheets

(56) References Cited

U.S. PATENT DOCUMENTS

| | | | |
|---|---|---|---|
| 2021/0082382 A1* | 3/2021 | Pinhas | G06F 16/685 |
| 2021/0090535 A1* | 3/2021 | Miles | G10H 1/0008 |
| 2021/0109964 A1* | 4/2021 | Rein | G06N 5/046 |
| 2021/0110801 A1* | 4/2021 | Estes | G10H 1/0025 |
| 2021/0118416 A1* | 4/2021 | Rein | G06N 5/027 |
| 2021/0125592 A1* | 4/2021 | Rein | G06N 20/00 |
| 2021/0248983 A1* | 8/2021 | Balassanian | G06F 21/16 |
| 2021/0312897 A1* | 10/2021 | Ackerman | G10L 13/02 |
| 2021/0326102 A1* | 10/2021 | Morsy | G10L 25/30 |

\* cited by examiner

METHOD AND SYSTEM FOR AI CONTROLLED LOOP BASED SONG CONSTRUCTION

TECHNICAL FIELD

This disclosure relates generally to methods of editing and generating audio content and, in more particular, to methods of utilizing a machine learning AI for an automatic loop based song construction.

BACKGROUND

Music or song generation has been a goal and dream of many people for as long as music has been around. However due to the missing knowledge of intimate details regarding the intricacies of music styles or music making in general, generating—writing music has been the privilege of people having the necessary knowledge and education. With the advent of the personal computer and the widespread adoption of these devices in the home consumer market software products became available that relieved the user from having to know the particulars regarding for example measure, bar and harmonies. These software products provided graphical user interfaces offering a new visualization approach to music content generating and editing thereby providing a plurality of users' easy access to the concept of music generation. Incidentally, with these software products the provision of content available for the generation of music to the user also received enhancements. A multitude of separate singular sound clips—so-called loops were provided to the user for selection and insertion into the graphical user interfaces.

Since the release of these type of software products, the task of music or song generation came into reach for a host of new users, who took advantage of these simplified approaches to music generation. Over the years, these software products have evolved, gotten more sophisticated, more specialized and even moved to mobile devices. However the general approach to music generation has stayed the same—selection and arrangement of pre-generated loops representing instruments like drums, bass, guitar, synthesizer, or vocals, to generate individual song parts with a length of 2, 4 or 8 measures, wherein these sorts of song parts are played together to yield a complete song. Most users are able to generate at least one or two song parts with the help of these software products that might be installed on either a mobile device or a desktop computer. Therefore, at least the generation of a verse or refrain of a desired own song has become a possibility for many casual users.

However in some instances in order to sound like a "real" piece of music, the piece should be longer than just a few measures, e.g., a two minutes of playtime, and consist of a plurality of (up to 16) individual song parts in order to feel like a real composition. This requirement—to generate so many song parts and arrange them with each other to generate a pleasing (in some sense) music piece requires patience, enthusiasm and the necessary eye and ear for detail. These requirements exceed the capabilities of most users and very often the user will eventually capitulate during the generation process and end it prematurely, so that the resulting fragment of a composition is too short or musically unsatisfying—ultimately ending as a fragmented music piece.

In addition to other problems a user might have, the creative side of the process may hit a dead end, which eventually can lead to an abandonment of the software product by the user. Of course, having a user abandon a project without ending it is also not desirable from a business standpoint. The workflow of the software should not be interrupted or stopped because the generation process is too hard for the user. The process should result in musically pleasing music pieces, which in a potentially associated online community are assessed, valued and potentially liked, thereby making sure that the user of the software product is satisfied with the music piece in general and additionally with the public response and in the end continues to use the software product.

Thus what is needed is a method for supporting a user when generating music pieces with a loop based music generating approach. The instant invention provides a trained AI ("artificial intelligence") system to generate or complete a music piece as a supplemental system to loop based music generation wherein the AI system is tasked with suggesting, provisioning and selecting suitable audio loops incorporating the initial input from the user into these suggestions and selections. As a result the music piece is completed and representing a musically sound result.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment there is provided a system and method for utilization of a machine learning AI for automatic loop based music construction. In one embodiment, the algorithm provides a music generation process with an AI system that utilizes analysis data from a loop database and a dataset that has been generated from a training and validation phase based on a database of available complete music items.

It should be clear that an approach such as this would be a tremendous aid to the user and would additionally mean a tremendous development in the creation of music pieces, wherein the formerly tedious and mostly straining process of manually generating song parts and filling these song parts with musically fitting audio loops that are organized in various loop packs is simplified and enhanced by the utilization of a trained machine learning AI.

Therefore, this approach finally delivers functionality to the user of music creation programs that enables a user to initiate, continue and complete a music generation process in a satisfactory manner or even allows a user to automate the music generation process completely. Because the provision and selection of audio loops is based on the expertise and analysis data provided by a machine learning AI, the loop suggestion stems from the complete loop database and is not limited by loop pack (a loop pack being a collection of audio loops that are associated with a specific genre, or instrument) based limitations therewith providing loop selection options to the user that he or she never would have selected. Therewith the variety of a potential music piece could potentially benefit extraordinarily from such a loop pack breaking suggestion and selection of audio loops.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments

BRIEF DESCRIPTION OF THE DRAWINGS

These and further aspects of the invention are described in detail in the following examples and accompanying drawings.

DETAILED DESCRIPTION

While this invention is susceptible of embodiments in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Figure 1:
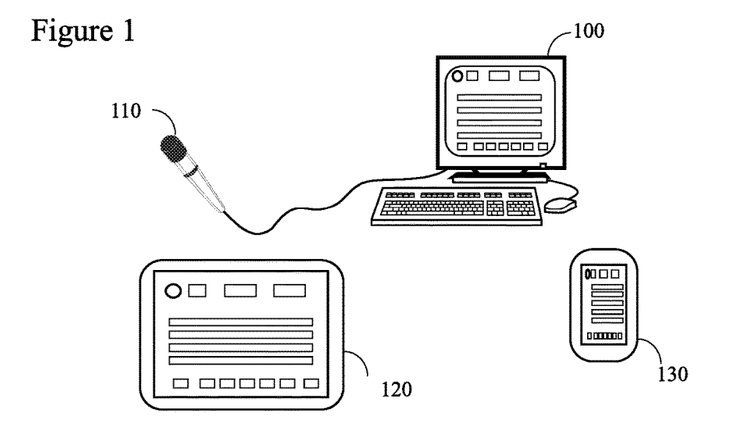
FIG. 1 is an illustration of the working environment of the instant invention.

As is generally indicated in FIG. 1, at least a portion of the instant invention will be implemented in form of software running on a user's computer 100. Such a computer will have some amount of program memory and hard disk storage (whether internal or accessible via a network) as is conventionally utilized by such units. Additionally a microphone 130 might be utilized so that the user can add voice-over narration to the multimedia work and record audio material for later insertion into the music item. Additionally it might also be possible and is shown in FIG. 1 that the process of the instant invention might be implemented on portable tablet computer devices 140 or on mobile devices, such as smart phones 150.

Figure 2:
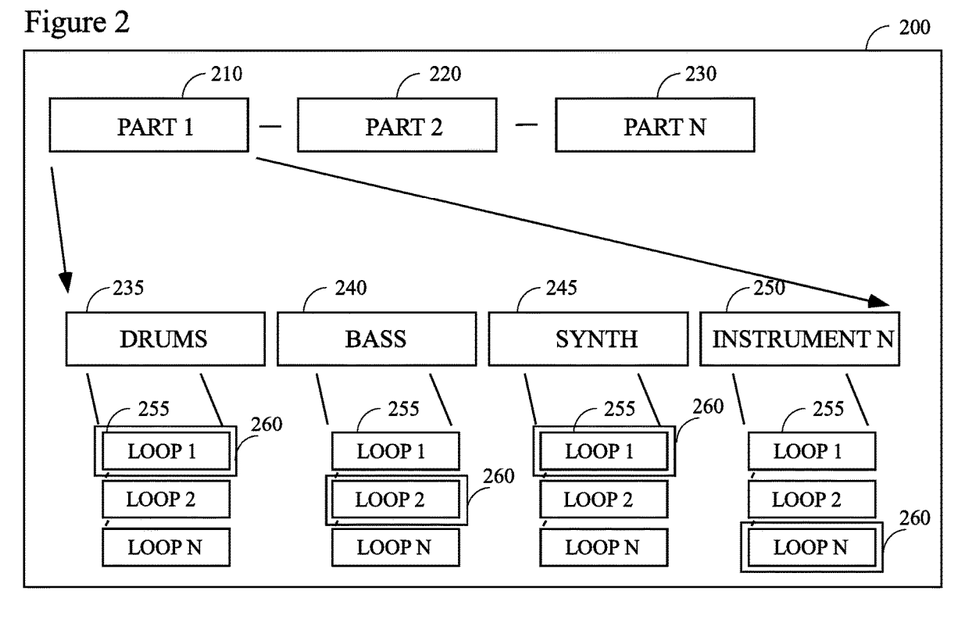
FIG. 2 is depicting the general and basic structure of a song or music piece according to the instant invention.

Turning next to FIG. 2, this figure illustrates the structure of a music item 200 according to an embodiment. Note that for purposes of the instant disclosure, the audio that is to be produced by the instant method will be referred to as a "music item", hereinafter.

This structure functions as the starting point for the music item generation process of the instant invention and represents a generic framework for a music item. According to this approach a music item is comprised of a plurality of individual song parts, illustrated by parts 1 210 and parts 2 220, wherein the choice of "N" for the last part 230 indicates that a complete song or music item consists of an arbitrary number of parts, "N". Each of these parts has a specific runtime, which might be defined by the user or the runtime might be defined as being, for example, 4 or 8 measures, etc. Further, in the instant example these parts might get a more precise denomination, for example intro, ending, turnaround, bridge, etc. FIG. 2 also illustrates that each part of a music item might consist of an arbitrary number of instruments, wherein these instruments are supplied with at least one audio loop, an audio loop being a repeatable section of audio material as is well known to those of ordinary skill in the art.

In FIG. 2 the instruments depicted, drums 235, bass 240 and synth 245, are only provided as examples and are not meant to limit the specification to only these instrument choices. It should be clear that any arbitrary choice of an instrument is possible, where "instrument" includes traditional instruments as well as percussion instruments such as toms, snares, base drums, etc. For each of the available instruments at least one audio loop 255 at a time will be selectable 260 and will be played when the playhead in a multitrack music item is moving through that song part, with all instruments that share that particular playback time being played simultaneously. The decision as to which audio loop will be selected will either come from the user or will be chosen automatically by utilizing a machine learning AI system as discussed below.

By way of further explanation, the instruments 235, 240, 245, and 250 in the example of FIG. 2 are all potentially played simultaneously, e.g. each instrument can be thought of as occupying a different track in a multi-track digital music item. The loops associated with each instrument 255 will typically be played sequentially, e.g., Drum Loop 1 could be followed by Drum Loop 2, etc., with the understanding that each of the loops might be repeated so that Drum Loop 1 might be repeated for several measures, whereas the Bass Part (track) might alternate between Bass Loop 1 and Bass Loop 2 over the same measures. Note that Loop 1 need not be played before Loop 2 but they can occur in any temporal order. Further, in some embodiments a Song Part might contain intervals where, for example, the Synth track is silent and the other tracks continue to play. This sort of arrangement is well known to those of ordinary skill in the art.

As was explained above, in some embodiments the loop that has been selected will be played continuously (looped) during the runtime of a single part, or during the playback all of the parts. In some variations it will be possible for the user to select and de-select or switch between individual loops of the instruments during the runtime of a particular part.

One embodiment provides for and utilizes an evolving and growing database of audio loops, where the audio loops are categorized according to particular instruments and organized in loop packs. These loop packs can represent specific music styles for example EDM, 50s, Drum'n Bass and House, however there could be other categories that might be used to organize the audio loops. Each individual loop pack features a plurality of different instruments and associated audio loops. This database of audio loops will be updated on a regular basis with new loop packs, wherein these updates are preferably being delivered over the Internet for free or in exchange for a particular payment option.

Figure 3:
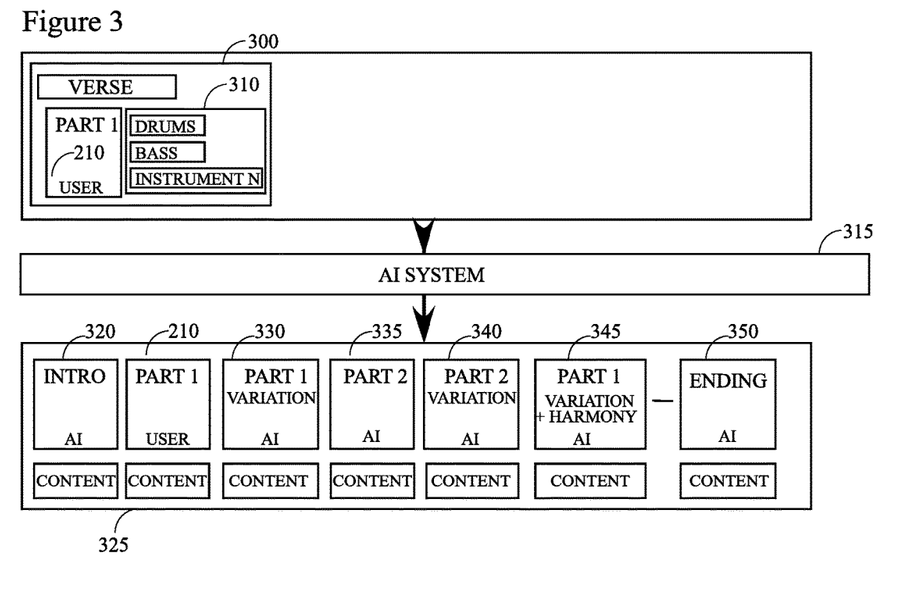
FIG. 3 is illustrating the interaction of the parts of the instant invention in a compressed form.

Turning next to the embodiment of FIG. 3, this figure illustrates the interaction of the components of the instant invention in a compressed form. In most cases the instant invention will start with an incomplete song or music item, comprising of at least one song part 210, for example a verse 300, generated and provided with content 310, preferably audio loops selected by the user. This fragment of a music item will be analysed by the AI system 315, which will sequentially process the fragment and, after processing, generate a completed music item 325 for review by the user. This completed music item will preferably consist of a proper intro 320 and ending part 350, the user generated initial music item fragment 210 and a plurality of additional song parts that have been generated by the AI system. The AI system generates and positions new song parts 335 or defines variations of the initial existing song part 1 330. The system taught herein therefore potentially will be able to define the structure of the entire music item as well as the contents of the music item given only one music item fragment (song part) as a starting point.

Figure 4:
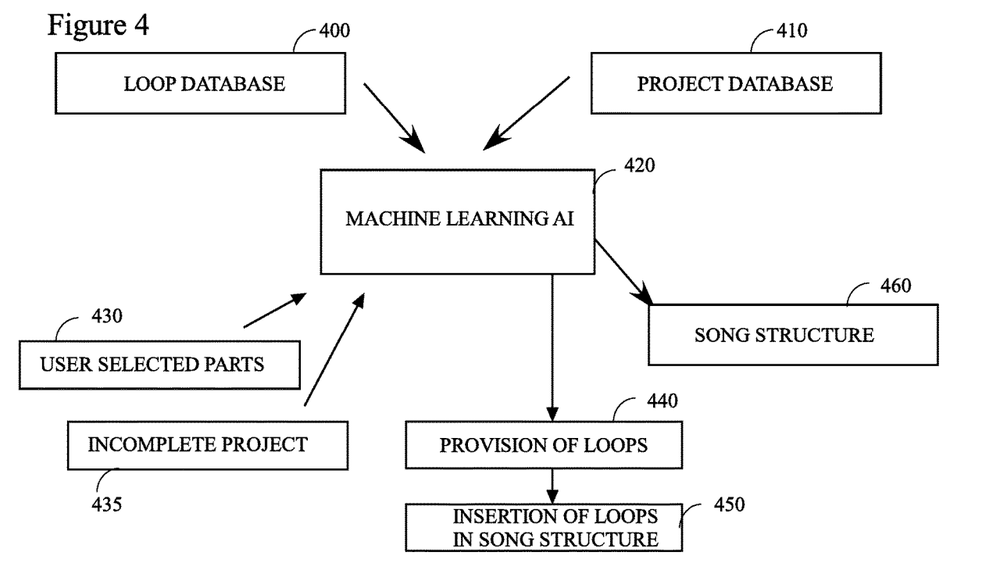
FIG. 4 is depicting the functionality of the machine learning AI of the instant invention.

Turning next to FIG. 4, this embodiment depicts the functionality of the machine learning AI 420 in connection with the available data sources of the instant invention. The system for machine-based learning constantly monitors the available database of audio loops 400, where "constantly monitors" means that, as has been disclosed, because the loop availability changes over time, new content is being added to the database of audio loops regularly—the AI system constantly evaluates and analyses these new additions of audio loops.

The constant monitoring process will start after an initial analysis of the complete loop database. After the initial analysis the AI system will have complete knowledge of every audio loop in the database for use during its constant monitoring of the progress of the construction of the music item. Among the sorts of information available for each loop are its auditory properties and affiliation with a particular loop pack and instrument. With this knowledge and the utilization of the auditory properties for the selection of the audio loops this embodiment provides the user with a wider bandwidth of audio loop selection independent of the confines of loop pack affiliation. Additionally the AI system will also be able to work globally if so indicated by the user, i.e., the AI system will provide loop suggestions to a user that might not be contained in a local user audio loop database. If this option is selected, the completed music item will be provided to the user along with a notice which of the inserted audio loops are stored in the local database and which audio loops would have to be purchased.

The content of the loop database 400 will be analysed by an algorithm which provides a plurality of data values for around 200 of fundamental/low level parameters of an audio loop including, for example, volume, loudness, FFT (e.g., the frequency content of the loop or sound based on its fast Fourier transform and/or its frequency spectrum) etc. In one preferred embodiment a further computation (e.g., principal component analysis ("PCA"), linear discriminant analysis ("LDA"), etc.) will be performed on the fundamental/low parameters to reduce their dimensionality. Methods of reducing dimensionality using PCA and LDA in a way to maximize the amount of information captured are well known to those of ordinary skill in the art. The resulting summary parameters which, in some embodiments might comprise at least eight or so parameters, will be used going forward. The summary parameters might include one that corresponds to the instrument(s) that are predominant in each loop. For purposes of the instant disclosure, the discussion will go forward assuming that the summary parameter count is "8", although those of ordinary skill in the art will recognize that fewer or greater parameters might be used depending on the situation.

Continuing with the present example, with these 8 parameters the instant invention can generate an 8-dimensional mapping of each audio loop, with musically similar loops being positioned in the vicinity of each other in this 8D space. This data might be stored in one database file and utilized by the machine learning AI as part of the process of an embodiment of the instant invention. Additionally the instant invention might provide the machine learning AI with the contents of a project database 410—where "project" means user generated, preferably complete, music items, which have been stored and made accessible by a number of different users as part of their work with the underlying multimedia creation software. The preferred structural layout of these projects will comprise at least 16 song parts with at least eight channels.

The data from the loop database 400 and the project database 410, if it is utilized, is fed into the machine learning AI to allow the machine learning AI to be trained. The training process of the machine learning AI is an ongoing and continuous process. Both the loop database as well as the project database are "living" databases where audio loops or projects can be added, deleted, or changed in a recurring manner, so the training process is also an ongoing "living" thing. The machine learning AI will be set into operation as soon as a data foundation has been set, one that allows the AI system to generate the content with a high confidence. In one embodiment, the audio analysis provides data values for at least 8 individual parameters, as has been disclosed earlier, in this embodiment, for each of the audio loops, which are provided to the machine learning AI in one accumulated audio loops database file.

The project database 410 in one embodiment might comprise of at least 200 k of projects or music items. In some embodiments the database might be accessible via the Internet and in other instances it might be stored on the user's local disk. In either case, a new user will preferably find some number of song projects already stored there. They might be curated music items that have been professionally designed and evaluated before being stored in the database. In some cases, the database will be stored in a remote location and made to be accessible by multiple users so that any number of individual user projects might be stored therein along with the curated music items. In the latter case, since there might be users who start and never finish a project, or are currently working on an unfinished project there might be projects that would not be suitable for use in the steps that follow. One method for dealing with this possibility is discussed below in connection with a "filtering" step below.

The machine learning AI, which might be a deep learning "Generative Adversarial Net" ("GAN"), is given access to user selected parts 430 (loops, etc.), or incomplete music item projects 435, where incomplete as applied to a project means that the project comprise at least one song part but do not fulfil the requirements of being a complete music item. The machine learning AI then processes the user selected parts 430 and/or incomplete music item projects 435, generates a proposed song structure 460 and provides a data collection that represents the desired audio loops for the generated song structure sections 440. The data collection is preferably a list of numbers representing values for each of the, preferably according to the current example, 8 individual parameters and, in a preferred variation, the instant invention will utilize a special distance method to search and select the best fitting audio loop from the loop database using the determined values for these parameters. The selected loops will then be automatically inserted into the generated song structure to complete the output music item 450.

Figure 5:
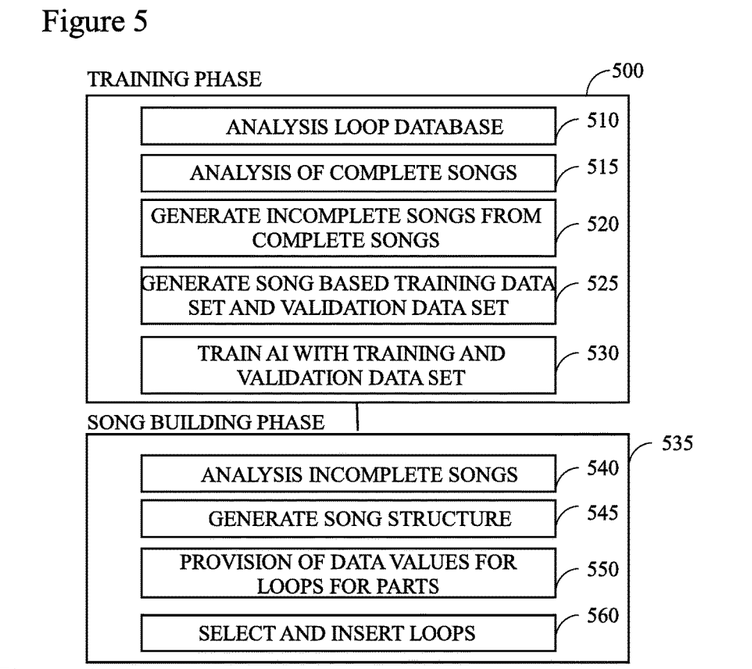
FIG. 5 is an illustration of a compressed form of the workflow of the instant invention.

Turning next to the embodiment of FIG. 5, this figure illustrates one workflow of the instant invention in a compressed form. This embodiment of a workflow discloses the training phase 500 and the song building phase 535 of the instant invention. In a first preferred step the instant invention will analyze each audio loop stored in the loop database 510 to determine its audio parameters. In some embodiments, the analysis of each loop will yield data values for around 200 low level/fundamental audio parameters associated with each loop. These data values will then be composited into a smaller number, e.g., by utilizing a PCA or LDA, to therewith result in at least 8, distinct features that describe a position of each audio loop in an 8 dimensional space. The summary data values for each individual audio loop will then preferably be stored in a digital database which might be a flat file, a hierarchical database, a relational database, etc. The file might be kept on magnetic or optical disk, stored in volatile or non-volatile memory, etc. The analysis of the audio loops is an ongoing process which will be performed initially to process the audio loops stored in a audio loops database and, after the initial processing of the current content of the database, subsequently performed on each new loop as it is added to the loop database.

In a next preferred step the instant invention will retrieve song projects/music items 515 from a song projects database and will carry out an analysis of these projects. Before the start of the analysis, the song projects will be filtered to remove music items that may not be good examples for training the AI. For example, music items whose structure, and associated loop selection exhibits too much randomness will be automatically discarded. That is, if the selected loops in the song project are too different from each other or if the loops "flip" back and both between successive song parts, e.g., if the internal consistency between song parts is too low, there is a high probability that this music item is not a good fit for the AI step that follows. The filtering process might also remove music items that use the same loops repeatedly or that seem to use an excessive number of loops (e.g., the song might rejected if it either uses too many different loops or two few). Additionally, the filter might remove songs projects that are too similar to each other so that no one song project is given excessive weight because it occurs multiple times in the database. Song projects that are not completed, e.g., that have empty tracks, gaps in the tracks, etc., will also preferably be eliminated. The filtering process is done to increase the probability that the remaining song projects provide a good dataset for use by the AI system in the training step that follows.

Note that for purposes of the instant disclosure, in some embodiments a complete song project/music item will comprise 16 song parts (e.g., measures, groups of measures, etc.) each of which contain at least eight individual audio channels/tracks, so in this embodiment the result of the analysis will generate a data collection of at least 16 song parts each with eight channels containing the audio loops, with each audio loop being represented by 8 summary audio parameter values. The remaining song projects/music items constitute the pool which will be used in the AI training phase that follows.

Each song project/music item in the training pool will then be converted to 16×8×8 data array to allow the GAN AI to process it. As has been mentioned previously, the choice of the number of audio parameter and song parts is well within the ability of one of ordinary skill in art at the time the invention was made and might vary depending on the particular circumstances and the 16×8×8 data array. The example discussed above was only presented to make clearer one aspect of the instant invention.

As a next preferred step of the training phase, the instant invention will create incomplete song projects/music items 520 by extracting one or more song parts from the filtered complete song projects/music items with the incomplete song projects/music items at least containing one filled song part. The complete song project/music piece and its incomplete counterpart are, for the training phase, arranged in pairs. As will be discussed further below, some of these incomplete song projects/music items will be used to train the AI and the remaining portion will be used to validate the training, which will be explained in the next step.

In this next preferred step, the instant invention will generate a training dataset and a validation dataset. The pairs of complete and incomplete song projects/music items are split into two datasets, in some instances this might be done randomly, to create the datasets 525 needed in the next step. The split is preferably 90/10, with 90 percent of the complete/incomplete pairs utilized during the training phase and 10 percent utilized by the validation phase. Of course, that split is only given as an example and other divisions are possible.

Next, and in some embodiments, the instant invention will automatically prepare the AI for use with the training and validation datasets 530. In the training process the AI will be given the pairs of incomplete and complete song projects/music items, preferably 90 percent of the pool of filtered song projects/music items. The AI system will in this step accumulate knowledge (data) about how the incomplete song projects/music items relate to their associated complete song projects/music items counterparts based at least in part on their structure. The structure might include, for example, a determination of which audio loops had been selected and where they occurred within the completed song project/music item, etc.

During the training phase an internal error value/error curve—which is an intrinsic part of an AI system—falls off or decreases as the generated song projects/music items are compared against the completed song projects/music items, with the error curve providing an estimate on the quality of the training level—not the progress. The functionality of the trained AI will then be validated using the validation data set where the AI processes the remaining 10 percent of incomplete song projects/music items from the complete/incomplete song projects and proposals for audio loops are provided, and the quality of the audio loop suggestion is then accessed. The quality of the output music item might be either measured by a human (e.g., an administrator of the AI system that monitors the quality of the recommendations of the AI system) or by an analysis of the output music item in comparison to the its complete counterpart, the complete version of the incomplete music item. That is, the AI generates an output music item that is "new" and the quality of this "new" output music item is being rated—to essentially rate the current efficiency of the AI. The rating is preferably not stored, since the data that is generated during the training and validation phase is only generated to give the AI the knowledge to work effectively when providing its functionality to the user. The training and validation steps will be a recurring process to steadily increase the quality of the AI system. Of course, if the error value is determined to be acceptable, the AI will be ready for use by the user. However, if the error is determined to be unacceptable it may be necessary to apply further filtering to the training data set, obtain additional complete song projects/music items, etc., before the AI is ready for use by the user. Those of ordinary skill in the art will understand how to evaluate the error value and whether or not it is acceptable for a given situation. In some cases, a predetermined error threshold will be established and if the calculated error value is not less than the predetermined error threshold additional steps will need to be taken to improve the quality of the training dataset before allowing the user to access it.

The user interaction within the song building phase 535 will begin by initiating an analysis of a user provided incomplete music item 540. The available song parts and the associated user selected audio loops will be analysed as described above. As a result, based on this analysis the AI system will generate a song structure corresponding to the requirements of a complete music item 545. The structure of the music item might be similar to that displayed in FIG. 3. Of course, this structure might be modified, or not, by imposing additional restrictions on the music item including, for example, that it must contain one or more of an intro, verse, chorus, bridge, outro, etc. Additionally the summary parameter values associated with each of the user selected audio loops will be determined. These values will be used in conjunction with the data obtained by training previously to create a complete music item in a subsequent step. The data from the user's incomplete music item will typically take the form of a list of individual numerical values that are associated with each user selected loop in each channel/track of each song part of the incomplete song project/music item 550. The instant invention then will utilize a predetermined distance method (e.g., Euclidean distance in 8 space) to select additional loops from the database for insertion into the user's incomplete music item 560 until a complete music item is obtained.

Figure 6:
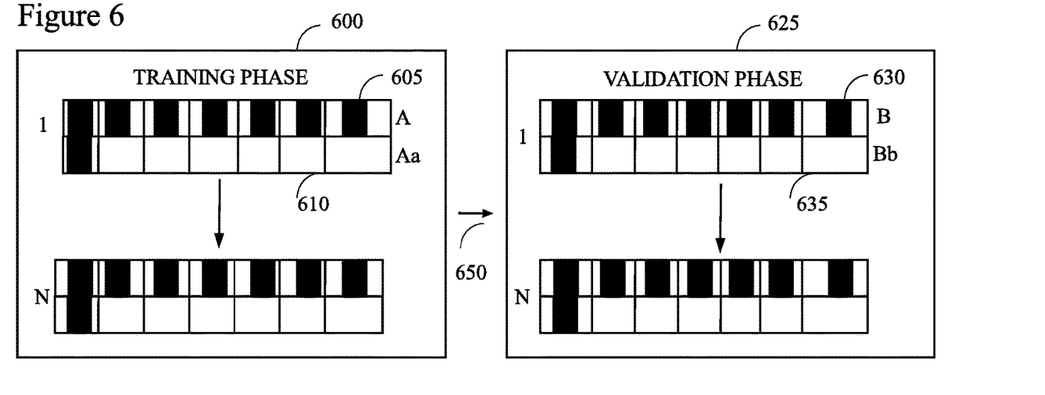
FIG. 6 depicts the training and validation phases of the instant invention.

Turning next to FIG. 6, this figure illustrates the training 600 and validation 625 phase of the AI of the instant invention in more detail. In the training phase the AI is supplied with the data from a number of complete song projects/music items. That is, the AI is provided with data from complete music items stored in the music item database, with the data values preferably being the summary values for each loop in the completed music items as discussed previously. Additionally information such as the music item runtime, song part number, and other things that might be associated with a complete song project/music item 605 might be determined. A filtering mechanism filters out song projects/music items whose song structure and associated loop selection does not meet predetermined criteria as discussed previously. The remaining songs projects/music items after filtering constitute a data set for use in the training phase. From each of these song projects/music items is created an incomplete music item counterpart by extracting one or more song parts from it, thus producing pairs of complete and incomplete song projects/music items. These pairs are then divided into a training set and a validation set as discussed previously.

The AI will preferably be provided with 90 percent of the complete/incomplete song project/music item data set in the training phase. In this phase the AI will utilize the available and gathered data from the database of the available audio loops and the complete song projects/music items and it will learn how an incomplete song project/music item may be developed into a complete song project/music item. That is, the AI learns what is necessary in terms of song structure, audio loop selection and arrangement to evolve from an initial incomplete song project/music item to a completely satisfying complete song project/music item.

In the training phase this process is carried out for all pairs of the selected 90, or other, percent of the set of incomplete and complete song projects/music items. In a next step 650 the AI is validating the learned structure and selection principles with the validation data set, wherein validation represents "completing" the incomplete song projects/music items by providing audio loop suggestions for the individual parts of the remaining 10 percent of incomplete song projects/music items and afterwards measuring the suggestions in view of the actually selected audio loops in the complete song project/music item counterpart belonging to the pair of incomplete/complete song projects/music items. The quality of the output complete music item can be measured by a human. In that case, the individual could provide a simple thumbs up or thumbs down rating, or a numerical rating (e.g., 1-10), etc. A measure of quality could also be obtained via an analysis of the output music item in comparison to the complete counterpart of the incomplete music item. So in essence, during the training phase the AI learns from the combination of complete—incomplete song projects/music items and in the validation phase this knowledge is put to use, with the AI utilizing the incomplete part of the complete/incomplete song projects/music items data set and filling these incomplete song projects/music items with data to form a complete music item. Then, the created music item is compared with the actual complete version of that incomplete/complete pair.

Figure 7:
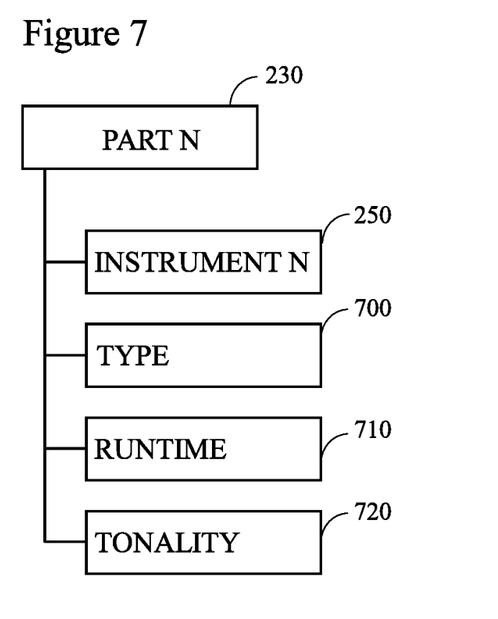
FIG. 7 depicts the structure and data layout of the parts of a song structure for a particular embodiment.

Turning next to FIG. 7, this figure illustrates one structural layout of the parts of the song structure according to an embodiment. Each song structure is comprising a plurality of individual parts N 230, which have a plurality of instruments 250 being associated to these parts, with these instruments being musically represented by the audio loops. Additionally a number of parts have a specific type 700 associated therewith, these type being for example intro or outro or variation. Furthermore, the part has an associated runtime 710, this runtime being 4 or 8 measures or a multiple thereof. This runtime might be also defined by the user or preset by the AI as part of the suggested song structure. Also each part will preferably have information stored in a record associated with it that describes the tonality 720 of each individual part. Examples of tonality include information about the particular key of the part, whether it is in a major or minor key, the chord changes (if any) that occur in the part, etc.

Of course, many modifications and extensions could be made to the instant invention by those of ordinary skill in the art. For example in one preferred embodiment the instant invention might be utilized for the recommendation of individual audio loops for individual parts, allowing the user to accompany the music item creation process by preferably allowing or denying the insertion of the recommended audio loop. In another embodiment the instant invention might allow the user to apply different weights to the audio parameters delivered by the analysis of each audio loops, therewith allowing the user to enhance the variation of the potential outcome. Additionally in another embodiment it might be possible to not have to rely on incomplete song projects/music items containing at least one song part, instead it might be possible to allow the user to communicate properties, tags of a desired song to therewith initiate the song creation process from that information. Furthermore, in another embodiment it might be possible to utilize an existing song as the starting point for the instant invention and generate a similar new song.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of constructing a digital music item, comprising the steps of:
    (a) obtaining a selection from a user of an incomplete version of said digital music item containing one or more user parts;
    (b) accessing a song project database, said song project database comprising a plurality of completed music items;
    (c) selecting a subset of completed music items in said song project database, thereby selecting a training dataset of song projects;
    (d) for each of said selected song projects in said training dataset, creating an associated incomplete song project by selecting one or more parts of each of said selected song projects;
    (e) training an artificial intelligence program using said subset of said song projects and said associated incomplete song projects,
    (f) using said trained artificial intelligence program and said user incomplete version of said digital music item to construct said music item; and
    (g) performing at least a portion of said digital music item for the user.

2. The method according to claim 1, wherein step (e) comprises the steps of:
    (e1) training an artificial intelligence program using said subset of said song projects and said associated incomplete song projects, (e2) selecting a subset of said song project database different from said training dataset, thereby creating a validation dataset;

(e3) for each of said song projects in said validation dataset, creating an associated incomplete validation song project by selecting one or more parts of each of said song projects in said validation dataset, and (e4) using said trained artificial intelligence program and each of said incomplete validation song projects to construct a validation music item, (e5) comparing one of more of said validation music items with a corresponding song project in said validation dataset to determine an error value of said trained artificial intelligence program, and, and step (f) comprises the step of:

(f1) only if said error value is below a predetermined value, using said trained artificial intelligence program and said user selection of one or more loops to construct said music item.

3. A method of constructing a digital music item, comprising the steps of:

(a) obtaining a selection of one or more audio loops from a user;

(b) initiating an analysis of each of said selected audio loops, thereby generating a plurality of summary data values for each of said selected audio loops;

(c) accessing an audio loop database, said audio loop database comprising a plurality of database audio loops;

(d) initiating an analysis of each of said plurality of database audio loops stored in said audio loop database, thereby generating a plurality of summary data values for each of audio loops in said audio loop database;

(e) accessing a song project database comprising a plurality of complete music items, wherein each of said plurality of complete music items comprises a plurality song parts, each of said song parts containing a plurality of song part audio loops;

(f) selecting a subset of said song project database, thereby selecting a training dataset of song projects;

(g) for each of said selected song projects in said training dataset, creating an associated incomplete song project by extracting one or more parts from each of said selected song projects;

(h) training an artificial intelligence program using said subset of said song projects and said associated incomplete song projects;

(i) using said trained artificial intelligence program and said user selection of one or more audio loops to construct said music item; and (j) performing at least a portion of said digital music item for the user.

4. The method according to claim 3, wherein step (h) comprises the steps of:

(h1) training an artificial intelligence program using said subset of said song projects and said associated incomplete song projects, (h2) selecting a subset of said song project database different from said training dataset, thereby creating a validation dataset;

(h3) for each of said song projects in said validation dataset, creating an associated incomplete validation song project by selecting one or more parts of each of said song projects in said validation dataset, and (h4) using said trained artificial intelligence program and each of said incomplete validation song projects to construct a validation music item, (h5) comparing one of more of said validation music items with a corresponding song project in said validation dataset to determine an error value of said trained artificial intelligence program, and, and step (i) comprises the step of:

(i1) only if said error value is below a predetermined value, using said trained artificial intelligence program and said user selection of one or more loops to construct said music item.

5. The method of claim 3, wherein step (i) comprises the step of:

(i1) selecting said generated plurality of summarized data values representing said selected audio loop;

(i2) determining the song structure of said music item, wherein the song structure comprises of at least one song part containing at least one audio loop;

(i3) using said trained artificial intelligence program and said generated plurality of summarized data values representing said selected audio loop in an n-dimensional space to construct said music item by defining summarized data values representing audio loops in said n-dimensional space for each song part of the determined song structure;

(i4) initiating a special distance method to select the summarized data values representing audio loops in said n-dimensional space that are located near the summarized data values representing said selected audio loop in said n-dimensional space;

(i5) transforming the selected summarized data values to audio loops and inserting these audio loops into the at least one song part of the determined song structure, therewith constructing said music item.

6. The method of claim 3, wherein step (b) comprises the step of:

(b1) initiating an analysis of the selected audio loops, thereby generating a plurality of low level feature data values for at least a plurality of these low level features;

(b2) transforming said plurality of low level feature data with principal component analysis or linear discriminant analysis to obtain a number of summary data values for each of said selected audio loops.

7. The method of claim 3, wherein step (d) comprises the step of:

(d1) initiating an analysis of the low level features of said plurality of audio loops stored in said audio loop database, generating data values for at least a plurality of these low level features;

(d2) transforming these data values with principal component analysis or linear discriminant analysis to a singular number of coordinates in an n-dimensional space, n being the singular number of coordinates therewith representing said each audio loop in an n-dimensional space.

* * * * *